United States Patent [19]

Brin

[11] Patent Number: 4,898,410

[45] Date of Patent: Feb. 6, 1990

[54] LATCHING ARRANGEMENT FOR A TOP

[75] Inventor: Constantin Brin, Stuttgart, Fed. Rep. of Germany

[73] Assignee: Dr. Ing. h.c.F. Porsche AG, Weissach, Fed. Rep. of Germany

[21] Appl. No.: 244,670

[22] Filed: Sep. 15, 1988

[30] Foreign Application Priority Data

Sep. 16, 1987 [DE] Fed. Rep. of Germany ....... 3731068

[51] Int. Cl.$^4$ .............................................. B60J 7/185
[52] U.S. Cl. .............................. 292/241; 292/DIG. 5; 296/224
[58] Field of Search ................. 292/241, 242, DIG. 5, 292/239, 341.17; 296/224, 218

[56] References Cited

U.S. PATENT DOCUMENTS

| 3,039,837 | 6/1962 | Poe | 292/241 |
| 3,129,025 | 4/1964 | Krueger | 292/DIG. 5 |
| 3,494,659 | 2/1970 | Trenkler | 296/218 |
| 4,253,688 | 3/1981 | Hosooka | 292/241 |
| 4,664,436 | 5/1987 | Eyb | 296/224 |
| 4,830,426 | 5/1989 | Schlachter et al. | 292/239 |

FOREIGN PATENT DOCUMENTS

| 1911379 | 9/1970 | Fed. Rep. of Germany | 296/224 |
| 2333666 | 2/1975 | Fed. Rep. of Germany | 296/224 |

Primary Examiner—Gary L. Smith
Assistant Examiner—Eric K. Nicholson

[57] ABSTRACT

A latching mechanism for a foldable top at a windshield frame of a motor vehicle includes a pivot lever arranged on the side of the top and a mounting device provided at the windshield frame, whereby the pivot lever rotatably supported about an approximately horizontally aligned longitudinal axis cooperates with an actuating mechanism. In order to provide a latching mechanism for a top which has a good functioning combined with simple construction and in which the closing force acting in the vertical direction reaches its maximum value in the latching position of the top, the mounting device is formed by a rotatable roller which cooperates with a guide track provided at the pivot lever in such a manner that during the closing operation the guide track is displaced from an unlatched position extending laterally adjacent the roller about the lower area of the roller by way of intermediate positions into a latching position lying underneath the roller. The points of rotation of the pivot lever and of the roller are located on a common vertically extending auxiliary plane. During the closing operation, the upper point of rotation of the pivot lever travels downwardly along the auxiliary plane. In the latching position, the area of the guide track tangential to the roller is aligned at right angle to the vertical auxiliary plane.

21 Claims, 5 Drawing Sheets

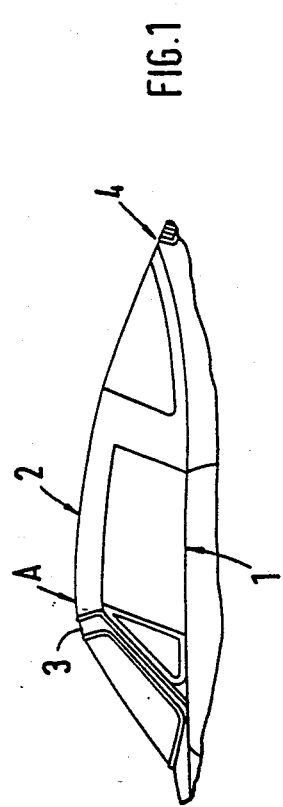
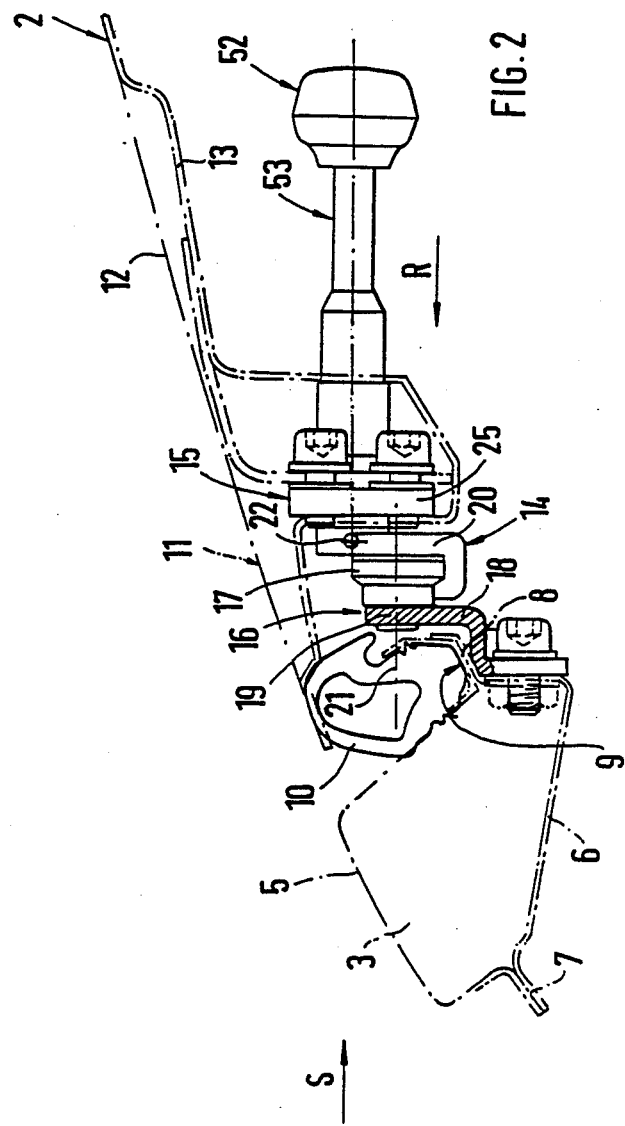

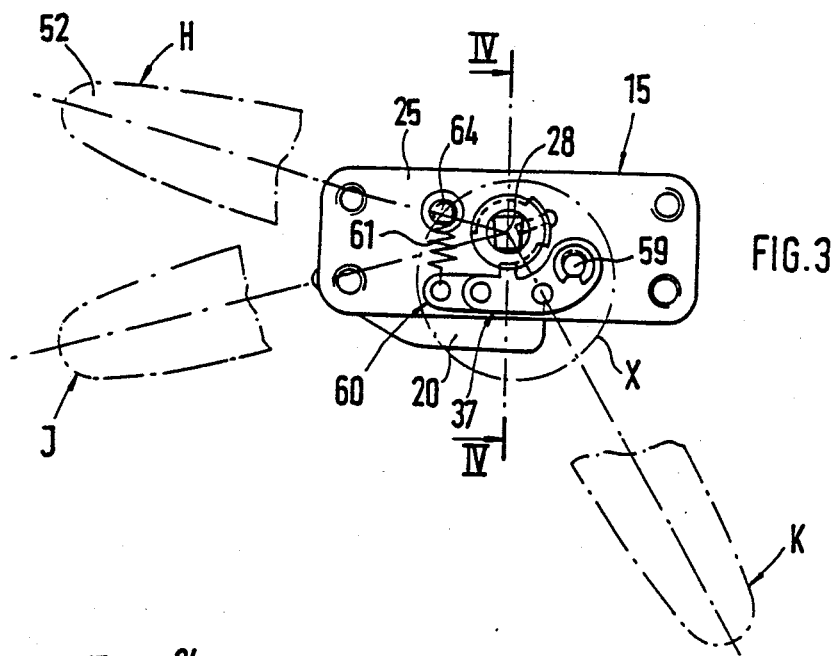
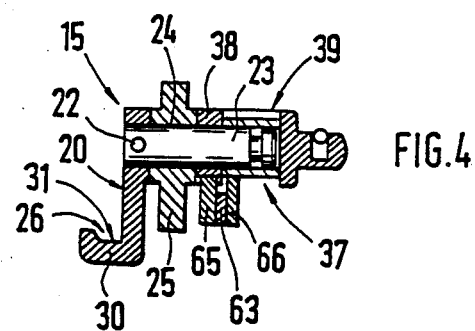
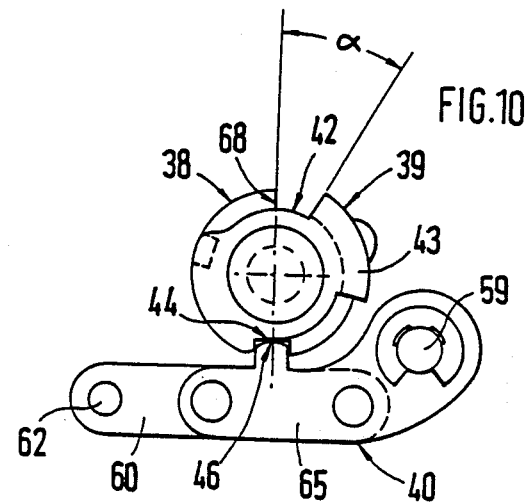

LATCHING ARRANGEMENT FOR A TOP

BACKGROUND AND SUMMARY OF THE INVENTION

The present invention relates to a latching arrangement for a top at the windshield frame of a motor vehicle, especially for a foldable top which includes a pivot lever arranged on the side of the top and a mounting device provided at the windshield frame, whereby the pivot lever supported about an approximately horizontally aligned longitudinal axis cooperates with an actuating mechanism.

A latching mechanism for a top having a good functioning is disclosed in the DE-PS 34 13 379 (corresponding to U.S. Pat. No. 4,664,436 to Wolfgang Eyb) which includes a fixed sliding-block guide arranged at the windshield frame and a pivot lever with a latching bolt arranged on the side of the top, whereby during the closing operation, the latching bolt cooperates with the sliding-block guide and pulls the top downwardly. Either a manual or an electric motorized actuation is provided for the pivot lever.

This prior art arrangement entails the disadvantage that for the two actuations, different sliding-block guides are required, as a result of which the manufacturing costs are increased. Furthermore, only slight vertical lift movements can be realized in the manual version by reason of the pivot angle of the pivot lever and the construction of the sliding-block guide, that is, the foldable top has to be pulled down so far by hand with considerable force application until the latching bolt engages in the sliding-block guide.

Therebeyond, the maximum closing force of the top in the vertical direction (prestress) occurs already prior to the closing position of the latching bolt, and more particularly when the latching bolt is at the lowest point of the upper track section of the sliding-block guide. By contrast, in the closing position, the latching bolt engages in a recess of the sliding-block guide whereby the recess is located higher than the lowest point of the upper track section.

It is the object of the present invention to provide a latching mechanism of the aforementioned type between a windshield frame and a forward frame part of the top which has a good functioning combined with a simple construction and in which large lift movements in the vertical direction are attainable also with the manually actuated pivot lever. Furthermore, the closing force of the top acting in the vertical direction is to have its maximum value in the latching position.

The underlying problems are solved according to the present invention in that the mounting device is formed by a rotatable roller which cooperates with a guide track provided at the pivot lever in such a manner that during the closing operation, the guide track is displaced from an unlocking position extending laterally adjacent the roller about the lower area of the roller by way of intermediate positions into a latching position located underneath the roller, whereby the points of rotation of the pivot lever and of the roller are arranged on a common, approximately vertically extending auxiliary plane and during the closing operation the upper point of rotation of the pivot lever travels on the vertical plane in the downward direction and in that in the latching position the area of the guide track tangential to the roller is aligned at right angle to the vertical auxiliary plane.

The advantages principally achieved with the present invention reside in that owing to the construction of the mounting device as rotatable roller and the arrangement of an elongated guide track at the pivot lever, a latching mechanism is created which combined with good functioning has a simple construction. Additionally, a large stroke in the vertical direction is achieved by the guide track also with a manual actuation of the pivot lever. The maximum closing force in the vertical direction (vertical prestress) is achieved in the latching position owing to the fact that the points of rotation of the pivot lever and of the roller lie in a common vertical plane and the guide track is arranged at right angle to the vertical auxiliary plane, and more particularly without loss in stroke (lift). No horizontally acting force occurs in the latching position between the guide track and the roller. Furthermore, large tolerances can be compensated for in the horizontal direction by means of the latching mechanism according to this invention. The arresting mechanism effects an additional securing of the pivot lever in its latching position and is characterized by a good functioning.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 1 is a partial elevational view of a passenger motor vehicle with a foldable top in accordance with the present invention;

FIG. 2 is a longitudinal cross-sectional view through a latching mechanism in accordance with the present invention for the foldable top, on an enlarged scale;

FIG. 3 an elevational view of the latching mechanism, taken in the of arrow R of FIG. 2;

FIG. 4 is a cross-sectional view taken along line IV—IV of FIG. 3;

FIG. 10 is a detail X of FIG. 3, on an enlarged scale;

DETAILED DESCRIPTION OF THE DRAWINGS

Figure 5:
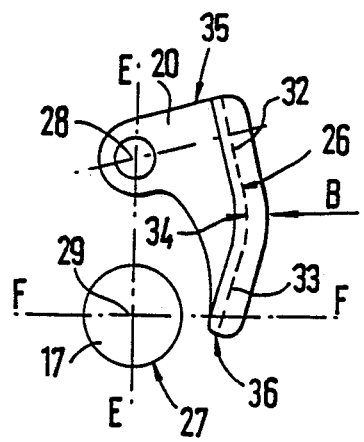
FIG. 5 is a partial elevational view of FIG. 3, whereby the latching mechanism occupies its unlatched position.

Referring now to the drawing wherein like reference numerals are used throughout the various views to designate like parts, and more particularly to FIG. 1, the partial area of a passenger motor vehicle illustrated in this figure includes above a belt line 1 a foldable or tiltable top 2 which extends in its closed position A between a windshield frame 3 and a rear area 4 and is detachably retained in position at the windshield frame 3. The windshield frame 3 is composed of two profile parts 5 and 6 which are connected with each other by welding along flanges 7 and 8 extending in the same direction (FIG. 2). The profile part 5 includes a U-shaped groove 9, into which is inserted a sealing member 10 on which rests an edge area of a forward frame portion generally designated by reference numeral 11 of the foldable top 2. The transversely extending forward frame portion 11 is composed of stamped-out sheet metal parts 12 and 13 which are connected with each other locally by welding, gluing or the like.

For fixing the foldable top 2 at the windshield frame 3, one latching mechanism each, which is generally designated by reference numeral 14, is provided on the two sides of a center longitudinal plane. In FIGS. 2 to 11, the left side of the latching mechanism 14, as viewed in the driving direction, is illustrated in each case. Each latching mechanism 14 includes a latching device 15 arranged at the forward frame portion 11 of the top 2 and a mounting device 16 provided at the windshield frame 3.

According to FIG. 2, the mounting device 16 is formed by a rotatable roller 17 which is secured at the windshield frame 3 by interconnection of a mounting support 18 that is angularly bent twice. The roller 17 is arranged at the upper end of an upright web 19 of the mounting support 18 and faces a pivot lever 20 of the latching device 15. The upwardly extending roller 17 is rotatably supported about an approximately horizontal longitudinal axis 21. The pivot lever 20 is connected by means of a pin 22 with an approximately horizontally directed shaft 23 extending in the vehicle longitudinal direction (FIG. 4). The shaft 23 is rotatably received in a cylindrical mounting section 24 of a base plate 25 whereby the upwardly extending bas plate 25 is retained in position at the forward frame part 11 of the top 2. The pivot lever 20 is arranged on the side of the base plate 25 facing the roller 17.

The roller 17 arranged at the windshield frame 3 cooperates with an elongated guide track 26 provided at the pivot lever 20 in such a manner that during the latching of the top 2, the guide track 26 is displaced from an unlatched position B (FIG. 5) extending laterally adjacent the roller 17 by way of intermediate positions (for example, C) about the lower area 27 of the roller 17 into a latching position D (FIG. 7) lying below the roller 17. The point of rotation 28 of the pivot lever 20 and the point of rotation 29 of the roller 17 are thereby located on a common vertical auxiliary plane E—E, whereby during the latching the upper point of rotation 28 of the pivot lever 20 travels downwardly along the plane E—E by the distance H (=lift or stroke) (FIG. 7) and assumes a position 28'. In the latching position D, the area of the guide track 26 which is tangential to the roller 27 is aligned at right angle to the auxiliary plane E—E.

The guide track 26 extends at a distance to the point of rotation 28 of the pivot lever 20 and extends, as viewed in the unlatched position B, approximately over the entire height of the pivot lever 20. According to FIG. 5, the guide track 26 is provided in the end area of the pivot lever 20 opposite the auxiliary plane E—E and is formed by a bent-back portion 30 extending approximately perpendicularly to the pivot lever 20, whereby an inside 31 of the bent-back portion 30 cooperates with the roller 17. According to FIG. 4, the guide track 26 is constructed groove-shaped as viewed in cross section, as a result of which the pivot lever 20 is fixed in the longitudinal direction by the roller 17.

The guide track 26 may either have an elongated rectilinearly-shaped configuration (not shown) or, however, for purposes of achieving a large stroke or lift H in the vertical direction, may consist of two rectilinear sections 32 and 33 adjoining one another at an angle, whereby the two sections 32 and 33 are connected with each other by way of a radius-shaped transition area 34 (FIG. 5).

Figure 6:
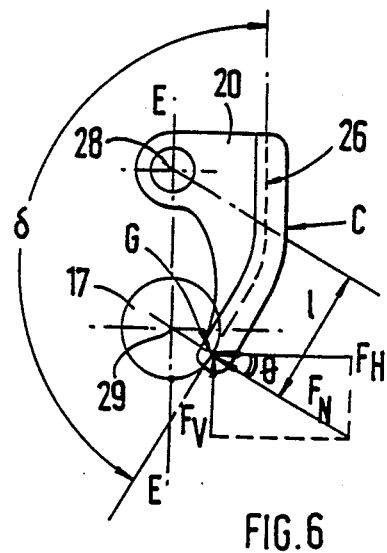
FIG. 6 a partial view of FIG. 3 illustrating an intermediate position of the latching mechanism in accordance with the present invention.

The two sections 32 and 33 subtend with one another an obtuse angle $\delta$ which in the illustrated embodiment amounts to about 150°. The first section 32 is arranged approximately at right angle to an upper boundary edge 35 of the pivot lever 20. In the unlatched position B, the guide track 26 is disposed laterally adjacent the roller 17 whereby the guide track 26 extends at a distance to the roller 17 and the free downwardly disposed end 36 of the guide track 26 extends approximately at the height of a horizontal plane F—F through the center point of the roller 17. After a pivot travel of about 15° (intermediate position C), the section 33 of the guide track 26 abuts laterally at the roller 17 and is tangential thereto (FIG. 6). The section 32 is thereby approximately vertically aligned. In this intermediate position C commences the cooperation of the guide track 26 and of the roller 17. The section 33 of the guide track 26 thereby extends tangentially to the roller 17 and contacts the same at a point G. In the intermediate position C, a reaction force $F_N$ acts in the Point of contact G which can be decomposed into a vertical force $F_V$ and a horizontal force $F_H$.

Figure 7:
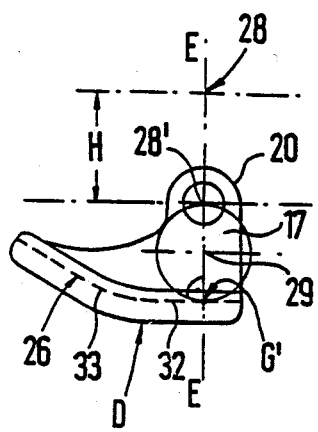
FIG. 7 a partial elevational view of FIG. 3 illustrating the latched position of the latching mechanism in accordance with the present invention.
Figure 8:
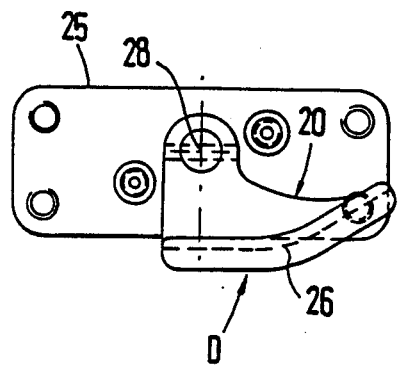
FIG. 8 an elevational view taken in the direction of arrow S of FIG. 2 of the latching device of the latching mechanism in accordance with the present invention.

During the movement of the pivot lever 20 from the intermediate position C into the latching position D, the guide track 26 is moved about the lower section 27 of the roller 17, whereby the point of rotation 28 of the pivot lever 20 travels downwardly into its end position 28' (FIG. 7). The point of contact G thereby moves in the clockwise direction and assumes the position G' in the latching position D. In the latching position D, the roller 17 cooperates with an end area of the section 32 whereby the section 32 is aligned at right angle to the auxiliary plane E—E. The vertical force $F_V$ becomes increasingly larger during the movement of the pivot lever 20 from the intermediate position C into the latching position D and reaches its maximum value in the latching position D, whereby the force $F_V$ then corresponds to the force $F_N$. The horizontal force $F_H$, by contrast, becomes increasingly smaller and has the value zero in the latching position D. The pivot lever 20 assumes a dead-center position in the latching position D.

Figure 9:
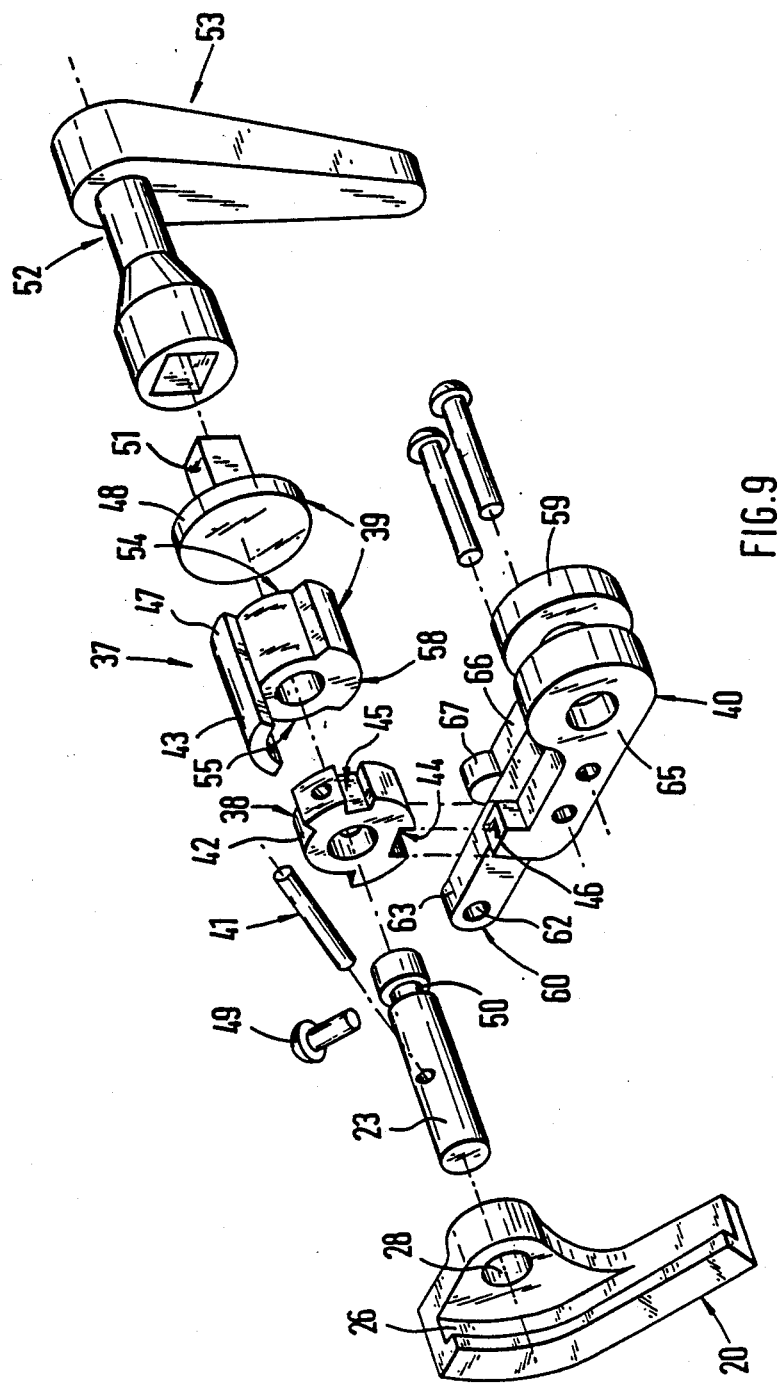
FIG. 9 a perspective view of the components of the latching device, however, without base plate.

For the additional securing the of the pivot lever 20 in its latching position D, an arresting device 37 is provided at the latching device 15 which includes a first fixed cam 38 and a second rotatable cam 39, whereby the two cams 38 and 39 cooperate with a spring-loaded latching hook 40 (FIGS. 4 and 9). The fixed cam 38 is fixed on the shaft 23 by means of a pin 41 and is disposed on the side of the base plate 25 opposite the pivot lever 20. According to FIG. 9, the cam 39 includes a circumferential recess 42 for an entrainment member 43 of the rotatable cam 39 as well as two U-shaped recesses 44 and 45 which are arranged offset to one another by an angle $\beta$. The two recesses 44 and 45 cooperate with a first rectangular detent 46 of the latching hook 40. The recess 42 is constructed edge-like at both end areas.

The rotatable cam 39 is constructed two-partite for manufacturing reasons whereby the parts 47 and 48 are fixedly connected with one another by welding (FIG. 9). According to FIG. 4, the rotatable cam 39 is arranged adjacent the fixed cam 38, whereby the entrainment member 43 extends over the fixed cam 38 and cooperates with the recess 42. A pin 49 is provided for the axial fixing of the cam 39 which engages in a radial notch 50 of the cam 23. The part 48 of the cam 39 extends—as viewed in the axial direction—adjacent the shaft 23 and includes at its end a square shaft 51, over which a handle 52 of an actuating device 53 is adapted to be mounted. However, the possibility also exists to provide in lieu of the manual actuating device a motorized actuating device 53 (not shown).

Figure 11:
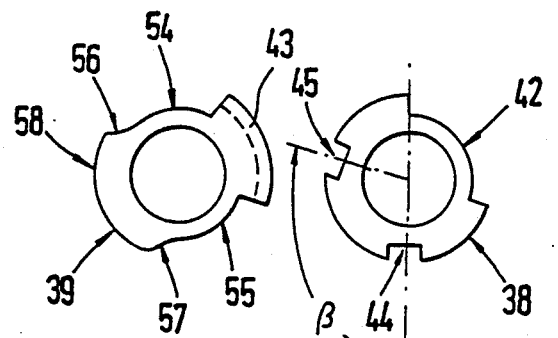
FIG. 11 is an elevational view of the two cams of the arresting device according to FIG. 10.
Figure 12:
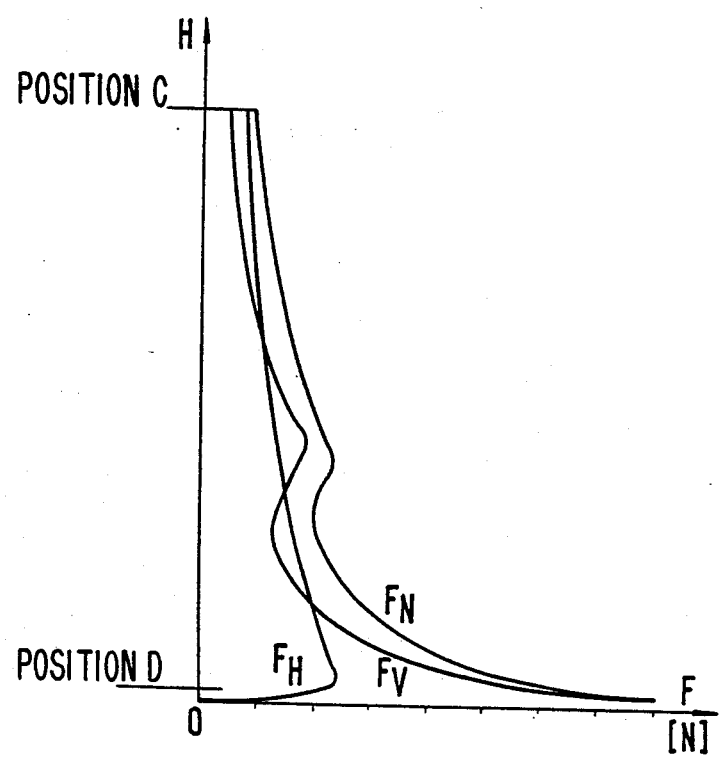
FIG. 12 is a diagram illustrating the curve of the force during the latching operation of the top.

According to FIG. 9, the rotatable cam 39 is provided on both sides of the entrainment member 43 with recesses 54 and 55 whereby the transition from the entrainment member 43 to the recesses 54 and 55 is constructed sharp-edged. Both recesses 54 and 55 are connected on the side opposite the entrainment member 43 by way of cam-shaped areas 56 and 57 at a projecting section 58 (FIGS. 9 and 11). This section 58 has a slightly smaller outer diameter than the outer diameter of the entrainment member 43.

The latching hook 40 is arranged underneath the shaft 23 and is pivotally supported with its upwardly drawn end 59 at the base plate 25 (FIGS. 3 and 10). The other end 60 of the latching hook 40 cooperates with a drawspring 61. One end of the drawspring 61 is suspended in an opening 62 of a center part 63 of the latching hook 40 (FIG. 9) whereas the other end cooperates with a bolt 64 located above the point of rotation 28 of the pivot lever 20 (FIG. 3).

The latching hook 40 is composed of the center part 63 and two outer parts 65 and 66 which are connected with the center part 63 by bolts, rivets or the like. The rectangular detent 46 is provided at the outer part 65 facing the base plate 25 whereas a semi-circularly shaped detent 67 is arranged at the other outer part 66. The two detents 46 and 67 are aligned with each other—as viewed in transverse direction.

In the latching position of the latching mechanism 14, the handle 52 assumes a position H, and the pivot lever 20 the position D. Furthermore, the rectangularly shaped detent 46 engages in the corresponding recess 44 of the fixed cam 38 (FIGS. 3 and 7).

For unlocking the latching mechanism 14, the handle 52 is pivoted through about 30° (angle α) in the downward direction into a position J (FIG. 3), as a result of which the entrainment member 43 of the cam 39 is in engagement with the edge 68 of the recess 42 of the fixed cam 38. At the same time, the semi-circularly shaped detent 67 cooperates with the cam-shaped area 57 of the cam 39 during the pivoting of the cam 39, and the latching hook 40 is moved downwardly by the cam-shaped area 57 so far that the rectangularly shaped detent 46 comes out of engagement with the recess 44 of the fixed cam 38. In the position J of the handle 52, the pivot lever 20 is still in its latching position D. By a further pivoting of the handle 52 into a position K, the Pivot lever 20 is displaced from the latching position D by way of intermediate positions (for example, C) into the unlatched position B and the folding top 2 can then be brought back into its folded-back or tilted-back position.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scoPe of the appended claims.

I claim:

1. A latching arrangement for a top at a windshield frame means of a motor vehicle, comprising pivot lever means attached on an edge of the top, mounting means attached at the windshield frame means, the pivot lever means which is rotatably supported about an approximately horizontally aligned longitudinal axis cooperating with an actuating means, the mounting means being formed by a rotatable roller means cooperating with a guide track means provided on the pivot lever means in such a manner that during the closing operation, the guide track means is displaced from an unlatched position extending laterally adjacent the roller means into contact with the roller means about a lower area of the roller means, at intermediate positions into a latching position located underneath the roller means, rotation axes of the pivot lever means and of the roller means being arranged on a common, approximately vertically extending plane, and during the closing operation the rotation axis of the pivot lever means travels downwardly on the vertical plane as the guide track is displaced from its unlatched to its latched position and an area of the guide track means underneath the roller means extends tangential to the roller means in the latching position and substantially at a right angle to the vertical plane.

2. A latching arrangement according to claim 1, wherein the roller means is rotatably supported about an approximately horizontally directed longitudinal axis.

3. A latching arrangement according to claim 1, wherein the roller means is secured at the windshield frame means by a support means.

4. A latching arrangement according to claim 1, wherein the guide track means extends at a distance to the rotation axis of the pivot lever means and in the unlatched position extends over substantially the entire height of the pivot lever means.

5. A latching arrangement according to claim 4, wherein the guide track means is constructed groove-shaped in cross-section and during cooperation with the roller means the groove-shape lockingly surrounds the same.

6. A latching arrangement according to claim 1, wherein the guide track means has an elongated configuration.

7. A latching arrangement according to claim 1, wherein the guide track means is composed of two substantially rectilinear sections adjoining one another at an angle, and wherein the two sections are connected with each other by way of a radius-shaped transition area.

8. A latching arrangement according to claim 1, wherein in its latching position the pivot lever means is additionally retained in position by an arresting means.

9. A latching mechanism according to claim 8, wherein the arresting means includes a first fixed cam means and a second rotatable cam means, and wherein the two cam means are operatively connected by a spring-loaded latching hook means.

10. A latching mechanism according to claim 9, wherein the rotatable cam means includes an entrainment member cooperating with a recess of the fixed cam means, and wherein the rotatable cam means is movable relative to the fixed cam means through a predetermined angle.

11. A latching mechanism according to claim 9, wherein a substantially rectangularly shaped detent means and a substantially semi-circularly shaped detent means are arranged at the latching hook means, the rectangularly shaped detent means engaging into a corresponding recess of the fixed cam means and thereby fixes the pivot lever means in its latching position.

12. A latching mechanism according to claim 11, wherein during pivoting of a handle from its latched position into an intermediate position, the semi-circularly shaped detent means of the latching hook means cooperates with a cam-shaped area of the rotatable cam means and displaces the latching hook means downwardly, as a result of which the rectangularly shaped detent means comes out of engagement with the corresponding recess.

13. A latching arrangement according to claim 3, wherein the roller means is rotatably supported about an approximately horizontally directed longitudinal axis.

14. A latching arrangement according to claim 3, wherein the guide track means extends at a distance to the point of rotation of the pivot lever means and in the unlatched position extends over substantially the entire height of the pivot lever means.

15. A latching arrangement according to claim 14, wherein the guide track means is constructed groove-shaped in cross-section and during cooperation with the roller means the groove-shape lockingly surrounds the same.

16. A latching mechanism according to claim 12, wherein the rotatable cam means includes an entrainment member cooperating with a recess of the fixed cam means, and wherein the rotatable cam means is movable relative to the fixed cam means through a predetermined angle.

17. A latching arrangement according to claim 15, wherein the guide track means has an elongated configuration.

18. A latching arrangement according to claim 15, wherein the guide track means is composed of two substantially rectilinear sections adjoining one another at an angle, and wherein the two sections are connected with each other by way of a radius-shaped transition area.

19. A latching arrangement according to claim 18, wherein in its latching position the pivot lever means is additionally retained in position by an arresting means.

20. A latching arrangement according to claim 19, wherein the guide track means extends at a distance to the point of rotation of the pivot lever means and in the unlatched position extends over substantially the entire height of the pivot lever means.

21. A latching arrangement according to claim 1, wherein the guide track means is constructed groove-shaped in cross-section and during cooperation with the roller means the groove-shape lockingly surrounds the same.

* * * * *